United States Patent [19]

Wilson

[11] Patent Number: 4,488,376
[45] Date of Patent: Dec. 18, 1984

[54] HERBICIDE APPLICATOR APPARATUS

[76] Inventor: Bill Wilson, P.O. Box 25, Lutz, Fla. 33549

[21] Appl. No.: 483,712

[22] Filed: Apr. 11, 1983

[51] Int. Cl.³ .............................................. A01C 15/00
[52] U.S. Cl. ......................................... 47/1.5; 47/1.7
[58] Field of Search .................. 47/1.5, 1.7; 111/85, 111/86; 239/214, 214.11, 214.13; 222/614, 617

[56] References Cited

U.S. PATENT DOCUMENTS

| | | | |
|---|---|---|---|
| 1,523,590 | 1/1925 | Hartshorn | 47/1.5 |
| 3,925,927 | 12/1975 | Linton | 47/1.5 |
| 4,223,478 | 9/1980 | McHugh | 47/1.5 |
| 4,347,684 | 9/1982 | Keeton | 47/1.5 |

Primary Examiner—Robert A. Hafer
Assistant Examiner—Bradley M. Lewis
Attorney, Agent, or Firm—Arthur W. Fisher, III

[57] ABSTRACT

A contact roller herbicide applicator apparatus comprising a substantially cylindrical roller applicator including an internally gravity fed hollow cylindrical roller reservoir having a plurality of feed apertures formed therein in combination with a multiple-ply herbicide applicator member including intermediate porous pad and an outer applicator member in surrounding relationship relative to the hollow cylindrical roller reservoir to apply herbicide in direct contact with weeds or other undesired foliage.

7 Claims, 4 Drawing Figures

HERBICIDE APPLICATOR APPARATUS

BACKGROUND OF THE INVENTION

1. Field of the Invention

A contact roller herbicide applicator apparatus comprising a multiple-ply applicator member for direct contact with weeds and other undesired foliage.

2. Description of the Prior Art

Numerous attempts have been undertaken to eradicate weeds and other undesirable foliage without damaging crops or other vegetation. The application of liquid chemicals to crop plants is an essential part of successful modern farming. Because of the large quantities of chemicals applied, a significant financial savings can be achieved by maximizing the effectiveness and efficiency of the application process. Examples include a roller applicator. A primary advantage of these applicators is that all of the liquid chemicals are applied to the crop plants with none of the chemicals being scattered into the air or onto the bare ground between crop rows.

Schepers, U.S. Pat. No. 4,265,048, shows a contact roller type fluid applicator comprising a roller having a pile carpet covering. The herbicide is fed from a storage tank to a pipe or wetting device having a plurality of feed apertures formed thereon.

Automatic moisture control is not new and has been applied to a variety of situations. In U.S. Pat. No. 4,137,931, Hasenbeck, discloses an irrigation control system in which soil matric potential as a function of water content is determined by a sensor, which in turn signals a solenoid water valve in a sprinkler line. U.S. Pat. No. 3,553,481 discloses an irrigation system automatically controlled by changes in resistance variation of subsurface sensors caused by changes in heat transfer as a function of soil moisture variation. While these control systems may be suitable for the irrigation of soil, neither is sufficiently condition-responsive to maintain the moisture concentration within a predetermined narrow range as would be required by the roller applicator.

Fegan, U.S. Pat. No. 3,376,877, discloses a similar automatic moisture control system for particulate feed material on a conveyor.

Biron, U.S. Pat. No. 3,320,694, shows a herbicide dispenser comprising a distribution bar having a plurality of perforations formed therein to feed herbicide to a porous sleeve. Herbicide is supplied internally to the distribution bar from a pressurized tank through a tube.

Mead, U.S. Pat. No. 4,302,904, discloses an agriculture applicator apparatus including a number of wig-like applicators that are disposed to receive herbicides or the like from spray heads for application on the foliage.

Bertness, U.S. Pat. No. 4,253,272, discloses an agricultural chemical applicator including a roller applicator disposed beneath a dispensing tube having a plurality of openings to feed chemicals to the exterior of the roller applicator for direct application to the weeds.

McClure, U.S. Pat. No. 4,320,595, shows a herbicide applicator using an endless rope immersed through a basis for supply of the herbicide.

SUMMARY OF THE INVENTION

The present invention relates to a contact roller herbicide applicator apparatus comprising a roller applicator, roller applicator supply tank and roller applicator drive operatively mounted on a frame.

The frame comprises a main frame member including an inner main frame element and an outer main frame extension element. The inner main frame element is interconnected to an axle and an attachment means. The roller applicator is adjustable on the frame to adjust the vertical height of the roller applicator relative to the weeds.

The roller applicator is rotatably connected to the inner main frame element and main frame extension element. The roller applicator includes an inner roller applicator axle.

A roller reservoir comprising a hollow cylindrical roller element including a plurality of feed apertures is operatively coupled in surrounding relationship to the roller applicator axle. An important feature of the invention is the multiple-ply herbicide applicator member which comprises an intermediate porous pad and an outer applicator element for directly contacting the weeds and other undesired foliage. The roller applicator supply tank is in fluid communication with the interior of the hollow cylindrical roller reservoir by a supply conduit.

The roller applicator drive comprises a first and second sprocket or coupling elements affixed to the axle element and inner roller applicator axle which are interconnected to a drive member or chain.

In operation, the roller applicator is adjusted vertically relative to the ground and foliage.

The entire apparatus is then pulled by the tractor or other vehicle permitting the outer applicator element to contact directly with the weeds or other undesired foliage. The entire roller applicator is rotated and driven by the chain being interconnected to the two sprockets as the wheels are rotated.

The unique combination of the perforated hollow cylindrical roller reservoir in combination with the intermediate porous pad and the outer applicator element control the rate of flow to the exterior of the roller apparatus to apply the necessary and desired herbicide.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
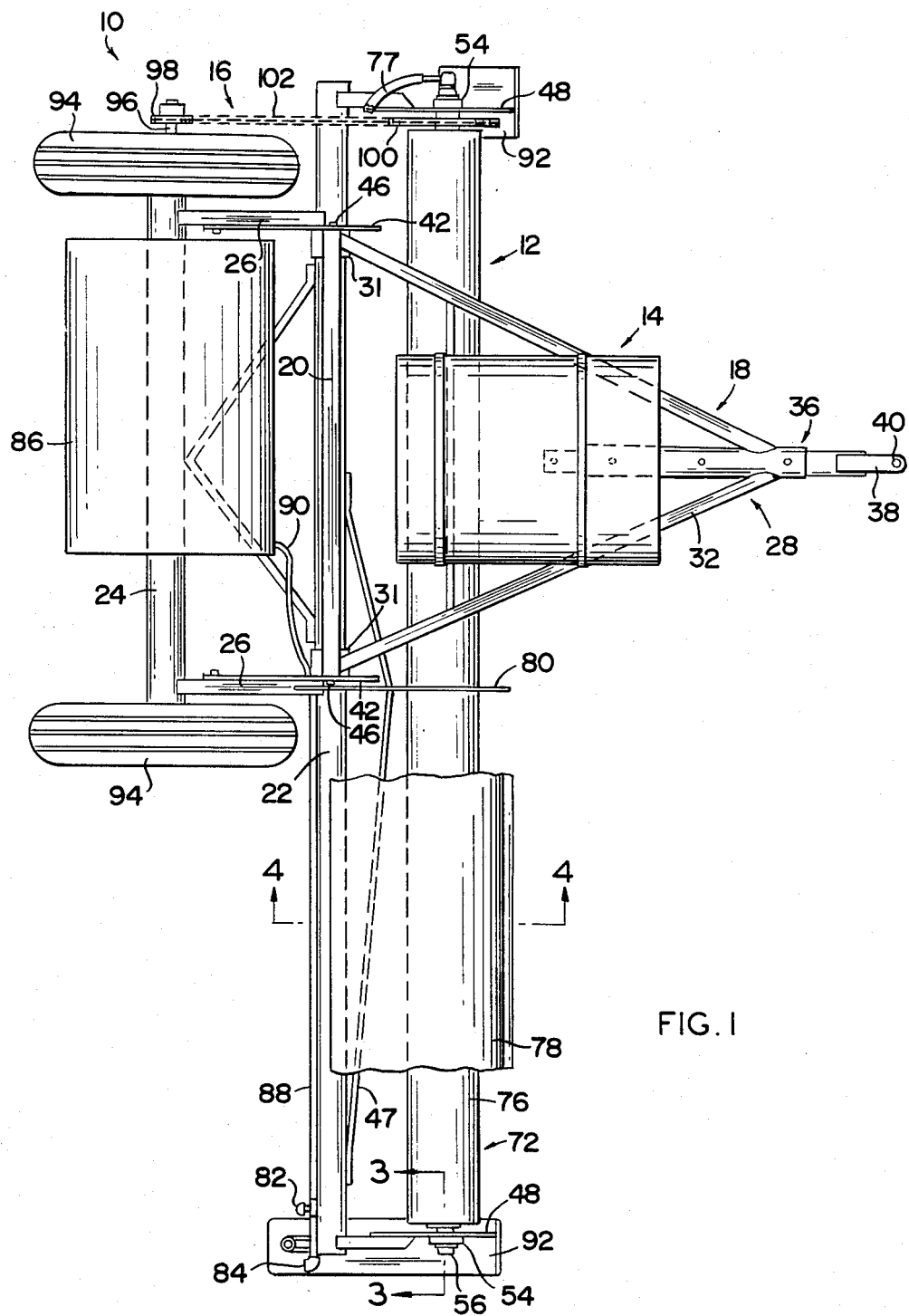
FIG. 1 is a top view of the contact roller herbicide applicator apparatus.
Figure 2:
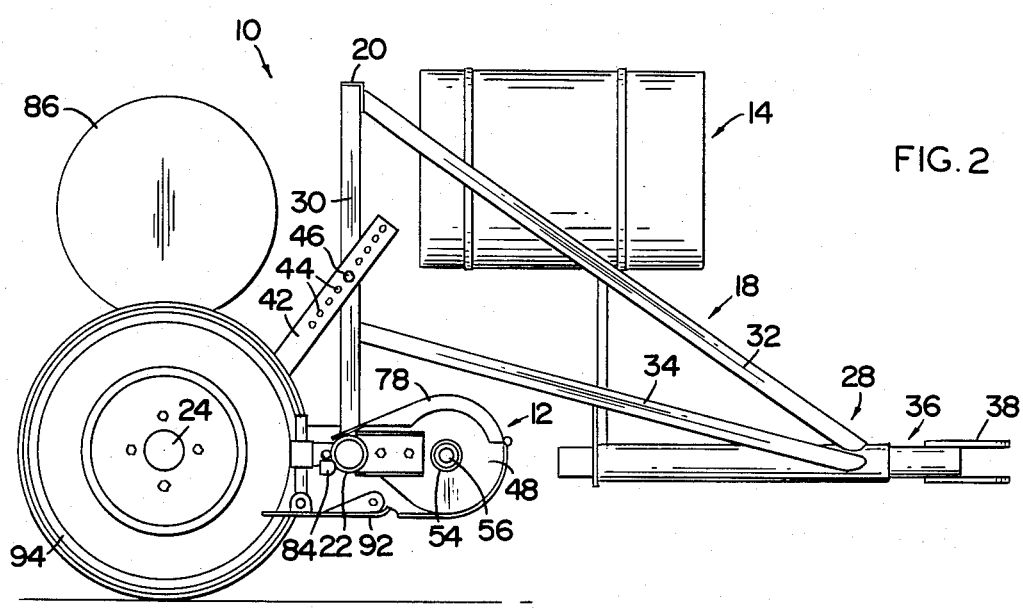
FIG. 2 is a side view of the contact roller herbicide applicator apparatus.

As best shown in FIGS. 1 and 2, the present invention relates to a contact roller herbicide applicator apparatus generally indicated as 10 comprising a roller applicator 12, roller applicator supply tank 14, and roller applicator drive 16 operatively coupled to a frame 18 as more fully described hereinafter.

The frame 18 comprises a main frame member including an inner main frame element 20 and an outer main frame extension element 22. The inner main frame element 20 is interconnected to an axle 24 by a pair of brackets 26 and a yoke 28 by a pair of upright members 30. The upright members 30 are rotatably coupled to the inner main frame member 20 by a pair of collars 31 disposed about the periphery thereof. The yoke 28 or attachment means comprises a pair of upper and lower diagonal members 32 and 34, respectively, in combination with an outer yoke extension element 36. A mechanical coupler comprising a pair of spaced apart plates 38 each having an aperture 40 formed therein is affixed to the forward portion of the yoke extension element 36. In addition, the upright member 30 is coupled to the brackets 26 by a pair of parallel adjustment bars 42 including a plurality of longitudinally disposed apertures 44 to selectively receive coupling elements 46 and an aperture (not shown) in the upright members 30 to permit height adjustment of the roller applicator 12 as more fully described hereinafter. The frame 18 further includes a main frame brace 47 to support the outer main frame extension element 22.

Figure 3:
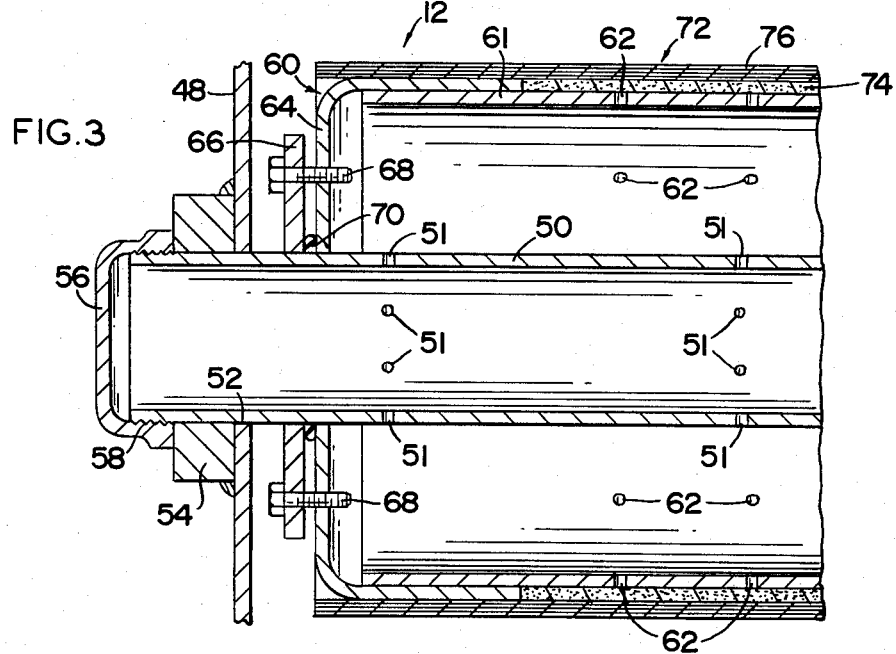
FIG. 3 is a partial cross-sectional front view of the roller applicator taken along lines 3—3 of FIG. 1.

As shown in FIG. 1, the roller applicator 12 is rotatably connected to the inner main frame element 20 and main frame extension element 22 by a pair of roller applicator brackets 48. As best shown in FIG. 3, the roller applicator 12 includes an inner roller applicator axle 50 including feed apertures 51 formed through the periphery thereof extending through a centerally disposed aperture 52 formed in the roller applicator brackets 48 to receive an axle bracket 54 and threaded cap 56 on the outer threaded portion 58 thereof.

A roller reservoir 60 comprising a hollow cylindrical roller element 61 including a plurality of feed apertures 62 and a pair of end caps 64 is operatively coupled in surrounding relationship to the roller applicator axle 50 by a pair of compression elements 66 by fasteners 68. An "O" ring seal 70 is wedged between the hollow cylindrical roller reservoir 61 and each compression element 66 to prevent leakage from the hollow cylindrical roller reservoir 61 when filled with herbicide as more fully described hereinafter. An important feature of the invention is the multiple-ply herbicide applicator member 72 which comprises an intermediate porous pad 74 and an outer applicator element 76 for directly contacting the weeds and other undesired foliage. The roller applicator supply tank 14 is in fluid communication with the interior of the hollow cylindrical roller reservoir 60 by supply conduit 77.

Figure 4:
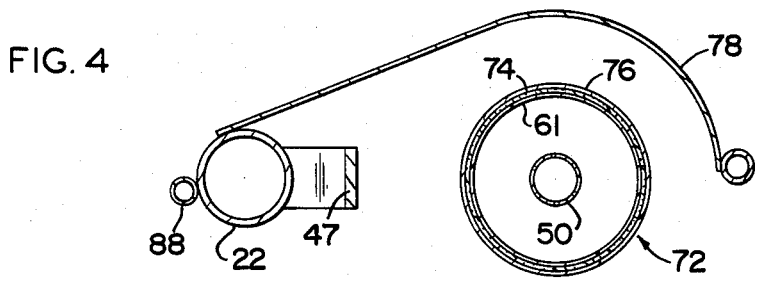
FIG. 4 is a partial cross-sectional side view of the roller applicator taken along lines 4—4 of FIG. 1.

As best shown in FIGS. 1 and 4, an arcuate roller applicator shield 78 affixed to the main frame member 20 by shield bracket 80 is disposed about the upper 180 degrees of the multiple-ply herbicide applicator member 72.

In addition to the roller applicator 12, the contact roller herbicide applicator apparatus 10 includes a spray means comprising spray nozzles 82 and 84 in fluid communication with spray supply tank 86 by spray bar 88 affixed to the main frame support 20 and spray feed conduit 90.

As best shown in FIGS. 1 and 2, a skid shoe and guard 92 is affixed to the outer portion of the outer main frame extension element 22.

The frame 18 includes the axle 24 having a pair of wheels 94 attached to opposite ends of axle element 96 which is disposed within the axle 24. The roller applicator drive 16 comprises a first and second sprocket or coupling elements 98 and 100 affixed to axle element 96 and inner roller applicator axle 50 interconnected by drive member or chain 102.

In operation, the roller applicator 12 is adjusted vertically relative to the ground and foliage. This is accomplished by rotating the adjustment bars 42 which is interconnected with the coupling elements 46 passed through the desired apertures 46 and fastened to upright members 30 to secure the apparatus 10 in position.

The entire apparatus 10 is then pulled by the tractor or other vehicle (not shown) permitting the outer applicator element 76 to contact directly with the weeds or other undesired foliage. The entire roller applicator 12 is rotated and driven by the chain 102 being interconnected to the two sprockets 98 and 100 as the wheels 94 are rotated. In addition, the spray nozzles 82 and 84 may be used to spray weeds or undesired foliage under trees and the like where the entire apparatus 10 may not be physically driven.

The unique combination of the perforated hollow cylindrical roller reservoir 60 in combination with the intermediate porous pad 74 and the outer applicator element 76 control the rate of flow to the exterior of the roller apparatus 12 to apply the necessary and desired herbicide.

It will thus be seen that the objects set forth above, and those made apparent from the preceding description, are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language, might be said to fall therebetween.

Now that the invention has been described,

What is claimed is:

1. A contact roller herbicide applicator apparatus for eliminating weeds and other undesired foliage comprising a roller applicator rotatably mounted on a frame, a roller applicator supply in fluid communication with said roller applicator mounted on said frame to feed herbicide from said roller applicator supply to said roller applicator and a roller drive means coupled between said frame and said roller applicator to rotate said roller applicator when said contact roller herbicide applicator apparatus is moved over the ground, said roller applicator comprising a roller reservoir including a hollow roller element including at least one aperture formed therein having a porous pad disposed in surrounding relation relative thereto and a hollow roller applicator axle disposed within said hollow roller element including at least one aperture formed therein, said roller applicator supply feeding herbicide to the interior of said hollow roller applicator axle to be dispensed therefrom into said roller reservoir for feeding from said hollow roller element aperture through said porous pad to the weeds or other undesired foliage.

2. The contact roller herbicide applicator apparatus of claim 1 wherein said porous pad comprises an intermediate porous pad and said roller applicator further includes an outer applicator element in surrounding relation relative to said intermediate porous pad to receive the herbicide for direct application of the herbicide to the weeds or other undesired foliage.

3. The contact roller herbicide applicator apparatus of claim 1 wherein the herbicide is gravity fed from said roller applicator supply to the interior of said hollow roller element.

4. The contact roller herbicide applicator apparatus of claim 1 wherein said frame further includes a pair of wheels rotatably mounted on opposite ends of a frame axle and said roller applicator further includes a roller applicator axle disposed within said hollow roller element, said roller drive means comprises a first and second coupling element attached to said frame axle and said roller applicator axle respective, said first and second coupling element operatively interconnected by a drive member such that said roller applicator rotates as said pair of wheels rotates.

5. The contact roller herbicide applicator apparatus of claim 1 further including adjustment means to vertically adjust said roller applicator relative to the ground to selectively contact weeds or other undesired foliage of various heights above the ground.

6. The contact roller herbicide applicator apparatus of claim 5 wherein said frame comprises a main frame member rigidly attached to an axle having a pair of wheels rotatably attached to opposite ends thereof and at least one upright member rotatably coupled to said main frame member, said adjustment means comprising at least one adjustment bar rigidly affixed to said axle and selectively coupled to said upright member.

7. The contact roller herbicide applicator apparatus of claim 1 wherein said roller applicator further includes an arcuate roller applicator shield fixed to said main frame disposed substantially 180° about said roller applicator.

* * * * *